(12) United States Patent
Hoese et al.

(10) Patent No.: US 7,694,058 B2
(45) Date of Patent: Apr. 6, 2010

(54) STORAGE ROUTER AND METHOD FOR PROVIDING VIRTUAL LOCAL STORAGE

(75) Inventors: Geoffrey B. Hoese, Austin, TX (US); Jeffry T. Russell, Cibolo, TX (US)

(73) Assignee: Crossroads Systems, Inc., Austin, TX (US)

( * ) Notice: Subject to any disclaimer, the term of this patent is extended or adjusted under 35 U.S.C. 154(b) by 58 days.

(21) Appl. No.: 11/851,837

(22) Filed: Sep. 7, 2007

(65) Prior Publication Data

US 2007/0299995 A1 Dec. 27, 2007

Related U.S. Application Data

(63) Continuation of application No. 11/442,878, filed on May 30, 2006, now abandoned, which is a continuation of application No. 11/353,826, filed on Feb. 14, 2006, now Pat. No. 7,340,549, which is a continuation of application No. 10/658,163, filed on Sep. 9, 2003, now Pat. No. 7,051,147, which is a continuation of application No. 10/081,110, filed on Feb. 22, 2002, now Pat. No. 6,789,152, which is a continuation of application No. 09/354,682, filed on Jul. 15, 1999, now Pat. No. 6,421,753, which is a continuation of application No. 09/001,799, filed on Dec. 31, 1997, now Pat. No. 5,941,972.

(51) Int. Cl.
*G06F 3/00* (2006.01)
*G06F 13/00* (2006.01)
(52) U.S. Cl. ................ 710/305; 710/11; 709/258
(58) Field of Classification Search ........... 710/1–5, 710/8–13, 36–38, 126–131, 250, 305; 709/258; 714/42; 711/110–113
See application file for complete search history.

(56) References Cited

U.S. PATENT DOCUMENTS 3,082,406 A    3/1963   Stevens (Continued)

FOREIGN PATENT DOCUMENTS

AU    647414    3/1994

(Continued)

OTHER PUBLICATIONS

Black Box, SCSI Fiberoptic Extender, Single-Ended, Product Insert, 2 pages, 1996.

(Continued)

*Primary Examiner*—Christopher B Shin
(74) *Attorney, Agent, or Firm*—Sprinkle IP Law Group

(57) ABSTRACT

A storage router (56) and storage network (50) provide virtual local storage on remote SCSI storage devices (60, 62, 64) to Fiber Channel devices. A plurality of Fiber Channel devices, such as workstations (58), are connected to a Fiber Channel transport medium (52), and a plurality of SCSI storage devices (60, 62, 64) are connected to a SCSI bus transport medium (54) The storage router (56) interfaces between the Fiber Channel transport medium (52) and the SCSI bus transport medium (54). The storage router (56) maps between the workstations (58) and the SCSI storage devices (60, 62, 64) and implements access controls for storage space on the SCSI storage devices (60, 62, 64). The storage router (56) then allows access from the workstations (58) to the SCSI storage devices (60, 62, 64) using native low level, block protocol in accordance with the mapping and the access controls.

54 Claims, 2 Drawing Sheets

U.S. PATENT DOCUMENTS

| | | |
|---|---|---|
| 4,092,732 A | 5/1978 | Ouchi |
| 4,170,415 A | 10/1979 | Lemeshewsky et al. |
| 4,415,970 A | 11/1983 | Swenson et al. |
| 4,455,605 A | 6/1984 | Cormier et al. |
| 4,504,927 A | 3/1985 | Callan |
| 4,533,996 A | 8/1985 | Gartung et al. |
| 4,573,152 A | 2/1986 | Greene et al. |
| 4,603,380 A | 7/1986 | Easton et al. |
| 4,620,295 A | 10/1986 | Aiden, Jr. |
| 4,644,462 A | 2/1987 | Matsubara et al. |
| 4,695,948 A | 9/1987 | Blevins et al. |
| 4,697,232 A | 9/1987 | Brunelle et al. |
| 4,715,030 A | 12/1987 | Koch et al. |
| 4,751,635 A | 6/1988 | Kret |
| 4,787,028 A | 11/1988 | Finfrock et al. |
| 4,807,180 A | 2/1989 | Takeuchi et al. |
| 4,811,278 A | 3/1989 | Bean et al. |
| 4,821,179 A | 4/1989 | Jensen et al. |
| 4,825,406 A | 4/1989 | Bean et al. |
| 4,827,411 A | 5/1989 | Arrowood et al. |
| 4,835,674 A | 5/1989 | Collins et al. |
| 4,845,722 A | 7/1989 | Kent et al. |
| 4,864,532 A | 9/1989 | Reeve et al. |
| 4,897,874 A | 1/1990 | Lidinsky et al. |
| 4,947,367 A | 8/1990 | Chang et al. |
| 4,961,224 A | 10/1990 | Yung |
| 5,072,378 A | 12/1991 | Manka |
| 5,077,732 A | 12/1991 | Fischer et al. |
| 5,077,736 A | 12/1991 | Dunphy, Jr. et al. |
| 5,124,987 A | 6/1992 | Milligan et al. |
| 5,155,845 A | 10/1992 | Beal et al. |
| 5,163,131 A | 11/1992 | Row et al. |
| 5,185,876 A | 2/1993 | Nguyen et al. |
| 5,193,168 A | 3/1993 | Corrigan et al. |
| 5,193,184 A | 3/1993 | Belsan et al. |
| 5,202,856 A | 4/1993 | Glider et al. |
| 5,210,866 A | 5/1993 | Milligan et al. |
| 5,212,785 A | 5/1993 | Powers et al. |
| 5,214,778 A | 5/1993 | Glider et al. |
| 5,226,143 A | 7/1993 | Baird et al. |
| 5,239,632 A | 8/1993 | Larner |
| 5,239,643 A | 8/1993 | Blount et al. |
| 5,239,654 A | 8/1993 | Ing-Simmons et al. |
| 5,247,638 A | 9/1993 | O'Brien et al. |
| 5,247,692 A | 9/1993 | Fujimura |
| 5,257,386 A | 10/1993 | Saito |
| 5,297,262 A | 3/1994 | Cox et al. |
| 5,301,290 A | 4/1994 | Tetzlaff et al. |
| 5,315,657 A | 5/1994 | Abadi et al. |
| 5,317,693 A | 5/1994 | Cuenod et al. |
| 5,331,673 A | 7/1994 | Elko et al. |
| 5,347,384 A | 9/1994 | McReynolds et al. |
| 5,355,453 A | 10/1994 | Row et al. |
| 5,361,347 A | 11/1994 | Glider et al. |
| 5,367,646 A | 11/1994 | Pardillos et al. |
| 5,379,385 A | 1/1995 | Shomler |
| 5,379,398 A | 1/1995 | Cohn et al. |
| 5,388,243 A | 2/1995 | Glider et al. |
| 5,388,246 A | 2/1995 | Kasi |
| 5,394,402 A | 2/1995 | Ross et al. |
| 5,394,526 A | 2/1995 | Crouse et al. |
| 5,396,596 A | 3/1995 | Hashemi et al. |
| 5,403,639 A | 4/1995 | Belsan et al. |
| 5,410,667 A | 4/1995 | Belsan et al. |
| 5,410,697 A | 4/1995 | Baird et al. |
| 5,414,820 A | 5/1995 | McFarland et al. |
| 5,416,915 A | 5/1995 | Mattson et al. |
| 5,418,909 A | 5/1995 | Jackowski et al. |
| 5,420,988 A | 5/1995 | Elliott |
| 5,423,026 A | 6/1995 | Cook et al. |
| 5,423,044 A | 6/1995 | Sutton et al. |
| 5,426,637 A | 6/1995 | Derby et al. |
| 5,430,855 A | 7/1995 | Walsh et al. |
| 5,450,570 A | 9/1995 | Richek et al. |
| 5,452,421 A | 9/1995 | Beardsley et al. |
| 5,459,857 A | 10/1995 | Ludlam et al. |
| 5,463,754 A | 10/1995 | Beausoleil et al. |
| 5,465,382 A | 11/1995 | Day, III et al. |
| 5,469,576 A | 11/1995 | Dauerer et al. |
| 5,471,609 A | 11/1995 | Yudenfriend et al. |
| 5,487,077 A | 1/1996 | Hassner et al. |
| 5,491,812 A | 2/1996 | Pisello et al. |
| 5,495,474 A | 2/1996 | Olnowich et al. |
| 5,496,576 A | 3/1996 | Jeong |
| 5,504,857 A | 4/1996 | Baird et al. |
| 5,507,032 A | 4/1996 | Kimura |
| 5,511,169 A | 4/1996 | Suda |
| 5,519,695 A | 5/1996 | Purohit et al. |
| 5,530,845 A | 6/1996 | Hiatt et al. |
| 5,535,352 A | 7/1996 | Bridges et al. |
| 5,537,585 A | 7/1996 | Blickenstaff et al. |
| 5,544,313 A | 8/1996 | Shachnai et al. |
| 5,548,791 A | 8/1996 | Casper et al. |
| 5,564,019 A | 10/1996 | Beausoleil et al. |
| 5,568,648 A | 10/1996 | Coscarella et al. |
| 5,581,709 A | 12/1996 | Ito et al. |
| 5,581,714 A | 12/1996 | Amini et al. |
| 5,581,724 A | 12/1996 | Belsan et al. |
| 5,596,562 A | 1/1997 | Chen |
| 5,596,736 A | 1/1997 | Kerns |
| 5,598,541 A | 1/1997 | Malladi |
| 5,613,082 A | 3/1997 | Brewer et al. |
| 5,621,902 A | 4/1997 | Cases et al. |
| 5,632,012 A | 5/1997 | Belsan et al. |
| 5,634,111 A | 5/1997 | Oeda et al. |
| 5,638,518 A | 6/1997 | Malladi |
| 5,642,515 A | 6/1997 | Jones et al. |
| 5,659,756 A | 8/1997 | Hefferon et al. |
| 5,664,107 A | 9/1997 | Chatwanni et al. |
| 5,680,556 A | 10/1997 | Begun et al. |
| 5,684,800 A | 11/1997 | Dobbins et al. |
| 5,701,491 A | 12/1997 | Dunn et al. |
| 5,712,976 A | 1/1998 | Falcon et al. |
| 5,727,218 A | 3/1998 | Hotchkin |
| 5,729,705 A | 3/1998 | Weber |
| 5,743,847 A | 4/1998 | Nakamura et al. |
| 5,748,924 A | 5/1998 | Llorens et al. |
| 5,751,971 A | 5/1998 | Dobbins et al. |
| 5,751,975 A | 5/1998 | Gillespie et al. |
| 5,764,931 A | 6/1998 | Schmahl et al. |
| 5,768,623 A | 6/1998 | Judd et al. |
| 5,774,683 A | 6/1998 | Gulick |
| 5,778,411 A * | 7/1998 | DeMoss et al. ............... 711/4 |
| 5,781,715 A | 7/1998 | Sheu |
| 5,802,278 A | 9/1998 | Isfeld et al. |
| 5,805,816 A | 9/1998 | Picazo, Jr. et al. |
| 5,805,920 A | 9/1998 | Sprenkle et al. |
| 5,809,328 A | 9/1998 | Nogales et al. |
| 5,812,754 A | 9/1998 | Lui et al. |
| 5,819,054 A | 10/1998 | Ninomiya et al. |
| 5,825,772 A | 10/1998 | Dobbins et al. |
| 5,835,496 A | 11/1998 | Yeung et al. |
| 5,845,107 A | 12/1998 | Fisch et al. |
| 5,845,722 A | 12/1998 | Makohl et al. |
| 5,848,251 A | 12/1998 | Lomelino et al. |
| 5,857,080 A | 1/1999 | Jander et al. |
| 5,860,137 A | 1/1999 | Raz et al. |
| 5,864,653 A | 1/1999 | Tavallaei et al. |
| 5,867,648 A | 2/1999 | Foth et al. |
| 5,884,027 A | 3/1999 | Garbus et al. |
| 5,889,952 A | 3/1999 | Hunnicutt et al. |
| 5,913,045 A | 6/1999 | Gillespie et al. |
| 5,923,557 A | 7/1999 | Eidson |
| 5,933,824 A | 8/1999 | DeKoning et al. |

| | | |
|---|---|---|
| 5,935,205 A | 8/1999 | Murayama et al. |
| 5,935,260 A | 8/1999 | Ofer |
| 5,941,969 A | 8/1999 | Ram et al. |
| 5,941,972 A | 8/1999 | Hoese et al. |
| 5,946,308 A | 8/1999 | Dobbins et al. |
| 5,953,511 A | 9/1999 | Sescila et al. |
| 5,959,994 A | 9/1999 | Boggs et al. |
| 5,963,556 A | 10/1999 | Varghese et al. |
| 5,974,530 A | 10/1999 | Young |
| 5,978,379 A | 11/1999 | Chan et al. |
| 5,978,875 A | 11/1999 | Asano et al. |
| 5,991,797 A | 11/1999 | Futral et al. |
| 6,000,020 A | 12/1999 | Chin et al. |
| 6,021,451 A | 2/2000 | Bell et al. |
| 6,029,168 A | 2/2000 | Frey |
| 6,032,269 A | 2/2000 | Renner, Jr. |
| 6,041,058 A | 3/2000 | Flanders et al. |
| 6,041,381 A | 3/2000 | Hoese |
| 6,055,603 A | 4/2000 | Ofer et al. |
| 6,065,087 A | 5/2000 | Keaveny et al. |
| 6,070,253 A | 5/2000 | Tavallaei et al. |
| 6,073,209 A | 6/2000 | Bergsten |
| 6,073,218 A | 6/2000 | DeKoning et al. |
| 6,075,863 A | 6/2000 | Krishnan et al. |
| 6,081,849 A | 6/2000 | Born et al. |
| 6,098,128 A | 8/2000 | Velez-McCaskey et al. |
| 6,098,149 A | 8/2000 | Ofer et al. |
| 6,108,684 A | 8/2000 | DeKoning et al. |
| 6,118,766 A | 9/2000 | Akers |
| 6,131,119 A | 10/2000 | Fukui |
| 6,134,617 A | 10/2000 | Weber |
| 6,141,737 A | 10/2000 | Krantz et al. |
| 6,145,006 A | 11/2000 | Vishlitsky et al. |
| 6,147,976 A | 11/2000 | Shand et al. |
| 6,147,995 A | 11/2000 | Dobbins et al. |
| 6,148,004 A | 11/2000 | Nelson et al. |
| 6,173,399 B1 | 1/2001 | Gilbrech |
| 6,185,203 B1 | 2/2001 | Berman |
| 6,202,153 B1 | 3/2001 | Diamant et al. |
| 6,209,023 B1 | 3/2001 | Dimitroff et al. |
| 6,219,771 B1 | 4/2001 | Kikuchi et al. |
| 6,223,266 B1 | 4/2001 | Sartore |
| 6,230,218 B1 | 5/2001 | Casper et al. |
| 6,243,827 B1 | 6/2001 | Renner, Jr. |
| 6,260,120 B1 | 7/2001 | Blumenau et al. |
| 6,268,789 B1 | 7/2001 | Diamant et al. |
| 6,308,247 B1 * | 10/2001 | Ackerman et al. .......... 711/206 |
| 6,330,629 B1 | 12/2001 | Kondo et al. |
| 6,330,687 B1 | 12/2001 | Griffith |
| 6,341,315 B1 | 1/2002 | Arroyo et al. |
| 6,343,324 B1 | 1/2002 | Hubis et al. |
| 6,363,462 B1 | 3/2002 | Bergsten |
| 6,401,170 B1 | 6/2002 | Griffith et al. |
| 6,421,753 B1 | 7/2002 | Hoese et al. |
| 6,425,035 B2 | 7/2002 | Hoese et al. |
| 6,425,036 B2 | 7/2002 | Hoese et al. |
| 6,425,052 B1 | 7/2002 | Hashemi |
| 6,453,345 B2 | 9/2002 | Trcka et al. |
| 6,484,245 B1 | 11/2002 | Sanada et al. |
| D470,486 S | 2/2003 | Cheng |
| 6,529,996 B1 | 3/2003 | Nguyen et al. |
| 6,547,576 B2 | 4/2003 | Pend et al. |
| 6,560,750 B2 | 5/2003 | Chien et al. |
| 6,563,701 B1 | 5/2003 | Peng et al. |
| 6,775,693 B1 | 8/2004 | Adams |
| 6,792,602 B2 | 9/2004 | Lin et al. |
| 6,820,212 B2 | 11/2004 | Duchesne et al. |
| 6,854,027 B2 | 2/2005 | Hsu et al. |
| 6,862,637 B1 | 3/2005 | Stupar |
| 6,874,043 B2 | 3/2005 | Treggiden |
| 6,874,100 B2 | 3/2005 | Rauscher |
| 6,910,083 B2 | 6/2005 | Hsu et al. |
| 7,065,076 B1 | 6/2006 | Nemazie |
| 7,127,668 B2 | 10/2006 | McBryde et al. |
| 7,133,965 B2 | 11/2006 | Chien |
| 7,188,111 B2 | 3/2007 | Chen et al. |
| 7,216,225 B2 | 5/2007 | Haviv et al. |
| 7,251,248 B2 | 7/2007 | Trossell et al. |
| 7,281,072 B2 | 10/2007 | Liu et al. |
| 2002/0083221 A1 | 6/2002 | Tsai et al. |
| 2006/0218322 A1* | 9/2006 | Hoese et al. .................. 710/62 |
| 2006/0277326 A1 | 12/2006 | Tsai et al. |
| 2006/0294416 A1 | 12/2006 | Tsai et al. |

FOREIGN PATENT DOCUMENTS

| | | |
|---|---|---|
| AU | 670376 | 7/1996 |
| CA | 2066443 | 10/2003 |
| EP | 0810530 A2 | 12/1997 |
| EP | 0490973 B1 | 2/1998 |
| EP | 0827059 A2 | 3/1998 |
| GB | 2296798 A | 7/1996 |
| GB | 2297636 A | 8/1996 |
| GB | 2341715 | 3/2000 |
| IL | 095447 | 5/1994 |
| IL | 107645 | 9/1996 |
| JP | 5502525 | 4/1993 |
| JP | 5-181609 | 7/1993 |
| JP | 1993181609 A | 7/1993 |
| JP | 6301607 | 10/1994 |
| JP | 7-20994 | 1/1995 |
| JP | 1995020994 A | 1/1995 |
| JP | 8-230895 | 9/1996 |
| JP | 1997185594 A | 7/1997 |
| JP | 1997251437 A | 9/1997 |
| JP | 10097493 A | 4/1998 |
| WO | WO 91/03788 A1 | 3/1991 |
| WO | WO 98/36357 | 8/1998 |
| WO | WO 9733227 A1 | 8/1998 |
| WO | WO 99/34297 A1 | 7/1999 |

OTHER PUBLICATIONS

Block-Based Distributed File Systems, Anthony J. McGregor, Jul. 1997.
Compaq StorageWorks HSG80 Array Controller ACS Version 8.3 (Maintenance and Service Guide) Nov. 1998.
Compaq StorageWorks HSG80 Array Controller ACS Version 8.3 (Configuration and CLI Reference Guide) Nov. 1998.
CRD-5500, Raid Disk Array Controller Product Insert, pp. 1-5.
CRD-5500, SCSI Raid Controller OEM Manual, Rev. 1.3, Feb. 26, 1996, pp. 1-54.
CRD-5500, SCSI Raid Controller Users Manual, Rev. 1.3, Nov. 21, 1996, pp. 10-92.
Digital StorageWorks HSZ70 Array Controller HSOF Version 7.0 EK-SHZ70-RM.A01 CLI Reference Manual, Jul. 1, 1997.
Digital Storage Works, HSZ70 Array Controller, HSOF Version 7.0 EK-HSZ70-CG. A01, Digital Equipment Corporation, Maynard, Massachusetts, Jul. 1, 1997.
Digital StorageWorks, Using Your HSZ70 Array Controller in a SCSI Controller Shelf (DS-BA356-M Series), User's Guide, pp. 1-1 through A-5 with index, Jan. 1, 1998.
Digital StorageWorks HSZ70 Array Controller HSOF Version 7.0 EK-HSZ70-SV. A01, 1997.
Digital StorageWorks HSG80 Array Controller ACS Version 8.0 (User's Guide Jan. 1998.
DP5380 Asynchronous SCSI Interface, National Semiconductor Corporation, Arlington, TX, May 1989, pp. 1-32.
Emerson, "Encor Communications: Performance evaluation of switched fibre channel I/O system using—FCP for SCSI" Feb. 1, 1995, IEEE, pp. 479-484.
Fiber channel (FCS)/ATM internetworking: a design solution.
Fiber Channel storage interface for video-on-demand servers by Anazaloni, et al., Jun. 15, 1905.
Fibre Channel and ATM: The Physical Layers, Jerry Quam WESCON/94, published Sep. 27-29, 1994. pp 648-652.

Gen5 S-Series XL System Guide Revision 1.01 by Chen, Jun. 18, 1905.
Graphical User Interface for MAXSTRAT Gen5/Gen-S Servers User's guide 1.1, Jun. 11, 1996.
High Performance Data transfers Using Network-Attached Peripherals at the national Storage Laboratory by Hyer, Feb. 26, 1993.
IFT-3000 SCSI to SCSI Disk array Controller Instruction Manual Revision 2.0 by Infotrend Technologies, Inc., 1995.
Implementing a Fibre Channel SCSI transport by Snively, 1994.
"InfoServer 150—Installation and Owner's Guide", EK-INFSV-OM-001, Digital Equipment Corporation, Maynard, Massachusetts 1991, Chapters 1 and 2.
InfoServer 150VXT Photograph.
IBM Technical Publication: Guide to Sharing and Partitioning IBM Tape Library Dataservers, Nov. 1, 1996, pp. 1-256.
IBM Technical Publication: Magstar and IBM 3590 High Performance Tape Subsystem Technical Guide, Nov. 1, 1996, pp. 1-269.
Misc. Reference Manual Pages, SunOS 5.09.
Infoserver 100 System Operations Guide, First Edition Digital Equipment Corporation, 1990.
Johnson, D.B., et al., The Peregrine High Performance RPC System, Software-Practice and Experience, 23(2):201-221, Feb. 1993.
Local-Area networks for the IBM PC by Haugdahl.
New serial I/Os speed storage subsystems by Bursky, Feb. 6, 1995.
Petal: Distributed Virtual Disks, Edward K. Lee and Chandramohan A. Thekkath, ACM SIGPLAN Notices, vol. 31, Issue 9, Sep. 1996, pp. 84-92.
Pictures of internal components of the InfoServer 150, taken from http://bindarydinosaurs.couk/Museum/Digital/infoserver/infoserver.php in Nov. 2004.
Raidtec FibreArray and Raidtec FlexArray UltraRAID Systems, Windows IT PRO Article, Oct. 1997.
S.P. Joshi, "Ethernet controller chip interfaces with variety of 16-bit processors," electronic Design, Hayden Publishing Co., Inc., Rochelle Partk, NJ, Oct. 14, 1982. pp. 193-200.
Simplest Migration to Fibre Channel Technology Article, Digital Equipment Corporation, Nov. 10, 1997, published on PR Newswire.
Systems Architectures Using Fibre Channel, Roger Cummings, Twelfth IEEE Symposium on Mass Storage Systems, Copyright 1993 IEEE. pp. 251-256.
Office Action dated Jan 21, 2003 for U.S. Appl. No. 10/174,720.
Office Action dated Feb. 27, 2001 for U.S. Appl. No. 09/354,682.
Office Action dated Aug. 11, 2000 for U.S. Appl. No. 09/354,682.
Office Action dated Dec. 16, 1999 for U.S. Appl. No. 09/354,682.
Office Action dated Nov. 6, 2002 for U.S. Appl. No. 10/023,786.
Office Action dated Jan. 21, 2003 for U.S. Appl. No. 10/081,110.
Office Action in Ex Parte Reexamination U.S. Appl. No. 90/007,127, mailed Feb. 7, 2005.
Office Action in Ex Parte Reexamination U.S. Appl. No. 90/007,125, mailed Feb. 7, 2005.
Office Action in Ex Parte Reexamination U.S. Appl. No. 90/007,126, mailed Feb. 7, 2005.
Office Action in Ex Parte Reexamination U.S. Appl. No. 90/007,124, mailed Feb. 7, 2005.
Office Action in Ex Parte Reexamination U.S. Appl. No. 90/007,123, mailed Feb. 7, 2005.
European Office Action issued Apr. 1, 2004 in Application No. 98966104.6-2413.
Office Action dated Jan. 27, 2005 in U.S. Appl. No. 10/658,163.
Defendant's First Supplemental Trial Exhibit List, *Crossroads Systems, Inc., v. Chaparral Network Storage, Inc.*, C.A. No. A-00CA-217-SS (W.D. Tex. 2001). (CD-Rom).
Defendant's Third Supplemental Trial Exhibit List, *Crossroads Systems, Inc. v. Pathlight Technology, Inc.*, C.A. No. A-00CA-248-SS (W.D. Tex. 2001) (CD-Rom).
Plaintiff's Fourth Amended Trail Exhibit List, *Crossroads Systems, Inc. v. Chaparral Network Storage, Inc*, C.A. No. A-00CA-217-SS (W.D. Tex. 2001) (CD-Rom).
Plaintiff's Revised Trial Exhibit List, *Crossroads Systems, Inc. v. Pathlight Technology, Inc.*, C.A. No. A-00CA-248-SS (W.D. Tex. 2001). (CD-Rom).
Trail Transcripts, *Crossroads Systems, Inc. v. Chaparral Network Storage, Inc.*, C.A. No. A-00CA-217-SS (W.D. Tex. 2001) Day 1-4 (CD-Rom).
Trail Transcripts, *Crossroads Systems, Inc. v. Pathlight Technology, Inc.*, C.A. No. A-00CA-248-SS (W.D. Tex. 2001). Day 1-4 (CD-Rom).
Datasheet for CrossPoint 4100 Fibre Channel to SCSI Router (Dedek Ex 41 (ANCT 117-120)) (CD-ROM Chaparral Exhibits D012).
Symbios Logic—Software Interface Specification Series 3 SCSI RAID Controller Software Release 02.xx (Engelbrecht Ex 2 (LSI 1421-1658)) (CD-ROM Chaparral Exhibits D013), Dec. 3, 1997.
Press Release—Symbios Logic to Demonstrate Strong Support for Fibre Channel at Fall Comdex (Engelbrecht 12 (LSI 2785-86)) (CD-ROM Chaparral Exhibits D016), Nov. 13, 1996.
OEM Datasheet on the 3701 Controller (Engelbrecht 13 (LSI 01837-38)) (CD-ROM Chaparral Exhibits D017), Jun. 17, 1905.
Nondisclosure Agreement Between Adaptec and Crossroads Dated Oct. 17, 1996 (Quisenberry Ex 25 (CRDS 8196)) (CD-ROM Chaparral Exhibits D020).
Organizational Presentation on the External Storage Group (Lavan Ex 1 (CNS 182242-255)) (CD-ROM Chaparral Exhibits D021), Apr. 11, 1996.
Bridge Phase II Architecture Presentation (Lavan Ex 2 (CNS 182287-295)) (CD-ROM Chaparral Exhibits D022), Apr. 12, 1996.
Bridge. C, Bridge Between SCSI-2 and SCSI-3 FCP (Fibre Channel Protocol) (CD-ROM Chaparral Exhibits P214).
Attendees/Action Items from Apr. 12, 1996 Meeting at BTC (Lavan Ex 3 (CNS 182241)) (CD-ROM Chaparral Exhibits D023).
Brooklyn Hardware Engineering Requirements Documents, Revision 1.4 (Lavan Ex 4 (CNS 178188-211)) (CD-ROM Chaparral Exhibits D024) by Pecone, May 26, 1996.
Brooklyn Single-Ended SCSI RAID Bridge Controller Hardware OEM Manual, Revision 2.1 (Lavan EX 5 (CNS 177169-191)) (CD-ROM Chaparral Exhibits D025), Mar. 2, 1996.
Coronado Hardware Engineering Requirements Document, Revision 0.0 (Lavan Ex 7 (CNS 176917-932)) (CD-ROM Chaparral Exhibits D027) by O'Dell, Sep. 30, 1996.
ESS/FPG Organization (Lavan Ex 8 (CNS 178639-652)) (CD-ROM Chaparral Exhibits D028), Dec. 6, 1996.
Adaptec MCS ESS Presents: Intelligent External I/O Raid Controllers "Bridge" Strategy (Lavan Ex 9 (CNS 178606-638)). (CD-ROM Chaparral Exhibits D029), Feb. 6, 1996.
AEC-7313 Fibre Channel Daughter Board (for Brooklyn) Engineering Specification, Revision 1.0 (Lavan Ex 10 (CNS 176830-850)) (CD-ROM Chaparral Exhibits D030), Feb. 27, 1997.
Bill of Material (Lavan Ex 14 (CNS 177211-214)) (CD-ROM Chaparral Exhibits D034), Jul. 24, 1997.
AEC-. 4412B, AEC-7412/B2 External RAID Controller Hardware 0EM Manual, Revision 2.0 (Lavan Ex 15 (CNS 177082-123)) (CD-ROM Chaparral Exhibits D035), Jun. 27, 1997.
Coronado II, AEC-7312A Fibre Channel Daughter (for Brooklyn) Hardware Specification, Revision 1.2 (Lavan Ex 16 (CNS 177192-210)) (CD-ROM Chaparral Exhibits D036) by Tom Yang, Jul. 18, 1997.
AEC-4412B, AEC7412/3B External RAID Controller Hardware OEM Manual, Revision 3.0. (Lavan Ex 17 (CNS 177124-165)) (CD-ROM Chaparral Exhibits D037), Aug. 25, 1997.
Memo Dated Aug. 15, 1997 to AEC-7312A Evaluation Unit Customers re: B001 Release Notes (Lavan Ex 18 (CNS 182878-879)) (CD-ROM Chaparral Exhibits D038).
Brooklyn Main Board (AES-0302) MES Schedule (Lavan Ex I9 (CNS 177759-763)) (CD-ROM Chaparral Exhibits D039), Feb. 11, 1997.
News Release—Adaptec Adds Fibre Channel Option to its External RAID Controller Family (Lavan Ex 20 (CNS 182932-934)) (CD-ROM Chaparral Exhibits D040), May 6, 1997.
AEC-4412B/7412B User's Guide, Rev. A (Lavan Ex 21) (CD-ROM Chaparral Exhibits D041), Jun. 19, 1905.
Data Book—AIC-7895 PCI Bus Master Single Chip SCSI Host Adapter (Davies Ex 1 (CNS 182944-64)) (CD-ROM Chaparral Exhibits D046), May 21, 1996.

Data Book—AIC-1160 Fibre Channel Host Adapter ASIC (Davies Ex 2 (CNS 181800-825)) (CD-ROM Chaparral Exhibits D047), Jun. 18, 1905.
Viking RAID Software (Davies Ex 3 (CNS 180969-181026)) (CD-ROM Chaparral Exhibits D048), Jun. 18, 1905.
Header File with Structure Definitions (Davies Ex 4 (CNS 180009-018)) (CD-ROM Chaparral Exhibits D049), Aug. 8, 1996.
C++ SourceCode for the SCSI Command Handler (Davies Ex 5 (CNS 179136-168)) (CD-ROM Chaparral Exhibits D050), Aug. 8, 1996.
Header File Data Structure (Davies Ex 6 (CNS 179997-180008)) (CD-ROM Chaparral Exhibits D051), Jan. 2, 1997.
SCSI Command Handler (Davies Ex 7 (CNS 179676-719)) (CD-ROM Chaparral Exhibits D052), Jan. 2, 1997.
Coronado: Fibre Channel to SCSI Intelligent RAID Controller Product Brief (Kalwitz Ex I (CNS 182804-805)) (CD-ROM Chaparral Exhibits D053).
Bill of Material (Kalwitz Ex 2 (CNS 181632-633)) (CD-ROM Chaparral Exhibits D054), Mar. 17, 1997.
Emails Dated Jan. 13-Mar. 31, 1997 from P. Collins to Mo re: Status Reports (Kalwitz Ex 3 (CNS 182501-511)) (CD-ROM Chaparral Exhibits D055).
Hardware Schematics for the Fibre Channel Daughtercard Coronado (Kalwitz Ex 4 (CNS 181639-648)) (CD-ROM Chaparral Exhibits D056).
Adaptec Schematics re AAC-340 (Kalwitz Ex 14 CNS 177215-251)) (CD-ROM Chaparral Exhibits D057).
Bridge Product Line Review (Manzanares Ex 3 (CNS 177307-336)) (CD-ROM Chaparral Exhibits D058).
AEC Bridge Series Products-Adaptec External Controller RAID Products Pre-Release Draft, v.6 (Manzanares Ex 4 (CNS 174632-653)). (CD-ROM Chaparral Exhibits D059), Oct. 28, 1997.
Hewlett-Packard Roseville Site Property Pass for Brian Smith (Dunning Ex 14 (HP 489) (CD-ROM Chaparral Exhibits D078), Nov. 7, 1996.
Distribution Agreement Between Hewlett-Packard and Crossroads (Dunning Ex 15 (HP 326-33) (CD-ROM Chaparral Exhibits D079).
HPFC-5000 Tachyon User's Manuel, First Edition (PTI 172419-839) (CD-ROM Chaparral Exhibits D084), May 1, 1996.
X3T10 994D—(Draft) Information Technology: SCSI-3 Architecture Model, Rev. 1.8 (PTI 165977) (CD-ROM Chaparral Exhibits D087).
X3T10 Project 1047D: Information Technology—SCSI-3 Controller Commands (SCC), Rev, 6c (PTI 166400-546) (CD-ROM Chaparral Exhibits D088), Sep. 3, 1996.
X3T10 995D—(Draft) SCSI-3 Primary Commands, Rev. 11 (Wanamaker Ex 5 (PTI 166050-229)) (CD-ROM Chaparral Exhibits D089), Nov. 13, 1996.
VBAR Volume Backup and Restore (CRDS 12200-202) (CD-ROM Chaparral Exhibits D099).
Preliminary Product Literature for Infinity Commstor's Fibre Channel to SCSI Protocol Bridge (Smith Ex 11; Quisenberry Ex 31 (SPLO 428-30) (CD-ROM Chaparral Exhibits D143), Aug. 19, 1996.
Letter dated Jul. 12, 1996 from J. Boykin to B. Smith re: Purchase Order for Evaluation Units from Crossroads (Smith Ex 24) CRDS 8556-57) (CD-ROM Chaparral Exhibits D144).
CrossPoint 4100 Fibre Channel to SCSI Router Preliminary Datasheet (Hulsey Ex 9 (CRDS 16129-130)) (CD-ROM Chaparral Exhibits D145), Nov. 1, 1996.
CrossPoint 4400 Fibre Channel to SCSI Router Preliminary Datasheet (Bardach Ex. 9, Quisenberry Ex 33 (CRDS 25606-607)) (CD-ROM Chaparral Exhibits D153), Nov. 1, 1996.
Fax Dated Jul. 22, 1996 from L. Petti to B. Smith re: Purchase Order from Data General for FC2S Fibre to Channel SCSI Protocol Bridge Model 11 (Smith Ex 25; Quisenberry Ex 23; Bardach Ex 11 (CRDS 8552-55; 8558) (CD-ROM Chaparral Exhibits D155).
Email Dated Dec. 20, 1996 from J. Boykin to B. Smith re: Purchase Order for Betas in February and March (Hoese Ex 16, Quisenberry Ex 25; Bardach Ex 12 (CRDS 13644-650) (CD-ROM Chaparral Exhibits D156).
Infinity Commstor Fibre Channel Demo for Fall Comdex, 1996 (Hoese Ex 15, Bardach Ex 13 (CRDS 27415) (CD-ROM Chaparral Exhibits D157).
Fax Dated Dec. 19, 1996 from B. Bardach to T. Rarich re: Purchase Order Information (Bardach Ex. 14; Smith Ex 16 (CRDS 4460)) (CD-ROM Chaparral Exhibits D158).
Miscellaneous Documents Regarding Comdex (Quisenberry Ex 2 (CRDS 27415-465)) (CD-ROM Chaparral Exhibits D165).
CrossPoint 4100 Fibre Channel to SCSI Router Preliminary Datasheet (Quisenberry) Ex 3 (CRDS 4933-34) (CD-ROM Chaparral Exhibits D166) (CD-ROM Chaparral Exhibits D166).
CrossPoint 4400 Fibre to Channel to SCSI Router Preliminary Datasheet; Crossroads Company and Product Overview (Quisenberry Ex 4 (CRDS 25606; 16136)) (CD-ROM Chaparral Exhibits D167).
Crossroads Purchase Order Log (Quisenberry Ex 9 (CRDS 14061-062)) (CD-ROM Chaparral Exhibits D172).
RAID Manager 5 with RDAC 5 for UNIX V.4 User's Guide (LSI-01854) (CD-ROM Chaparral Exhibits P062), Sep. 1, 1996.
Letter dated May 12, 1997 from Alan G. Leal to Barbara Bardach enclosing the original OEM License and Purchase Agreement between Hewlett-Package Company and Crossroads Systems, Inc. (CRDS 02057) (CD-ROM Chaparral Exhibits P130).
CR4x00 Product Specification (CRDS 43929) (CD-ROM Chaparral Exhibits P267), Jun. 1, 1998.
Symbios Logic—Hardware Functional Specification for the Symbios Logic Series 3 Fibre Channel Disk Array Controller Model 3701 (Engelbrecht Ex 3 (LSI-1659-1733) (CD-ROM Pathlight Exhibits D074).
Report of the Working Group on Storage I/O for Large Scale Computing; Department of Computer Science Duke University: CS-1996-21 (PTI 173330-347). (CD-ROM Pathlight Exhibits D098).
Brian Allison's 1999 Third Quarter Sales Plan (PDX 38 )CNS 022120-132)) (CD-ROM Pathlight Exhibits D201), Jun. 5, 2001.
Brooklyn SCSI-SCSI Intelligent External RAID Bridge Definition Phase External Documentation ((CD-ROM Pathlight Exhibits D129).
StorageWorks HSx70 System Specification by Steve Sicola dated Jun. 11, 1996 4:57pm, Revision 4.
ANSI TR X3.xxx-199x, Revision 9 of X3-991 D. Draft Proposed X3 Technical Report—Small Computer System Interface—3 Generic Packetized Protocol (SCSI-GPP). Computer and Business Equipment Manufacturers Assoc.
Enterprise Systems Connection (ESON) Implementation Guide, Jul. 1, 1996, IBM International Technical Support Organization, Poughkeepsie Center.
Digital Delivers Industry-Leading Enterprise-Class Storage Solutions. StorageWorks Family Provides Easiest Path to Fibre Channel. Three pages by Company News Oncall dated Sep. 9, 2004.
American National Standard for Information Technology—Fibre Channel Protocol for SCSI. ANSI X3.269-1996.
F1710A File Control Unit and F6493 Array Disk Subsystem by Hitoshi Matsushima, Shojiro Okada and Tetsuro Kudo, Feb. 3, 1995.
The Legend of AMDAHL by Jeffrey L. Rodengen (5 pages).
Office Action dated Feb. 6, 2007 from the Japanese Patent Office regarding related application No. 526873/2000.
InfoServer 100 System Operation Guide, Order No. EK-DIS1K-UG-001.
iNFOsERVER 100 Installation and Owner's Guide, Order No. EK-DIS1K-IN-001.
Software Product Description: Product Name: InfoServer 100 Software, Version 1.1 SPD 38.59.00, Nov. 1, 1991.
Software Product Description: Product Name: InfoServer Client for ULTRIX, Version 1.1, SPD 40.78.01, Apr. 1, 1993.
Draft Proposed American National Standard. X3.269-199X, Revision 012. Information System—dpANS Fibre Channel Protocol fo SCSI, Dec. 4, 1995.
Digital "System Support Addendum", SSA 40.78.01-A, AE-PNZJB-TE, pp. 1-3, Apr. 1993.
Digital "Software Product Description", SSA 40.78.01, AE-PNZJB-TE, pp. 1-3, Apr. 1993.
Digital Equipment Corporation, "InfoServer 100 Installation and Owner's Guide", Order No. EK-DIS1K-IN-001, First Edition, Oct. 1990.

Digital Equipment Corporation, "InfoServer 100 System Operation Guide", Order No. EK-DIS1K-UG-001, First Edition, pp. i-Index 5, Oct. 1990.

Elliott, Working Draft American National Standard, Project T10/1562-D, Revision 5, pp. i-432, Jul. 9, 2003.

Satran, "Standards-Track," May 2001, iSCSI, pp. 9-87, Nov. 2000.

Satran, et al. IPS Internet Draft, iSCSI, pp. 1-8, Nov. 2000.

APT Technologies, Inc., "Serial ATA: High Speed Serialized AT Attachment", Rev. 1.0a, pp. 1-310, Jan. 7, 2003.

Impactdata Launches Breakthrough Architecture for Network Storage.

Impactdata . . . News Release: Impactdata Introduces New Storage Architecture for High Performance Computing. 2 Pages.

Impactdata . . . News Release: Impactdata's Network Peripheral Adapter (NPA) Pushes Technology Envelope of Data Storage Management in High-Speed Computing Environments. 2 Pages.

Impactdata . . . News Release: Impactdata and Storage Concepts Announce Integration of FibreRAID II Storage Solution with Impactdata's Distributed Storage Node Architecture (DSNA). 2 Pages.

Impactdata . . . News Release: Breece Hill Libraries Now Able to Attach Directly to High Speed Networks Peripheral Adapter from Impactdata. 2 Pages.

Impactdata - DSNA Questions and Answers. 22 Pages.

Impactdata - Network Storage Solutions. 4 Pages.

Network Storage Building Blocks. 2 Pages.

Impactdata - NPA (Network Peripheral Interface). 4 Pages.

Impactdata - CPI (Common Peripheral Interfae). 2 Pages.

Impactdata - SNC (Storage Node Controller). 2 Pages.

Impactdata - DSNA (Distributed Storage Node Architecture) Protocol. 2 Pages.

Impactdata - DS-50. 2 Pages.

Impactdata - Corporate Fact Sheet. 1 Page.

Raider-5 "Disk Array Manual for the UltraSCSI Controller". Part No. 2610013-002. 191 Pages.

Impactdata - White Paper: Distributed Storage Node Architecture (DSNA). Jan. 1997.

Impactdata - DSNA Distributed Storage Node Architecture "Reference Guide". 44 Pages.

F1710 Logic Specification.

Translation of Final Office Action in JP 526873/2000 issued on May 14, 2008. 4 pages.

U.S. Office Action issued in U.S. Appl. No. 11/851,837 dated Dec. 22, 2008, Hoese, 7 pages.

English Translation of Japanese Laid-Open Publication No. 5-181609. 9 pp.

English Translation of Japanese Laid-Open Publication No. 7-20994. 57 pp.

F1710 File Control Unit (FCU) Logical Specifications. 11 pages.

\* cited by examiner

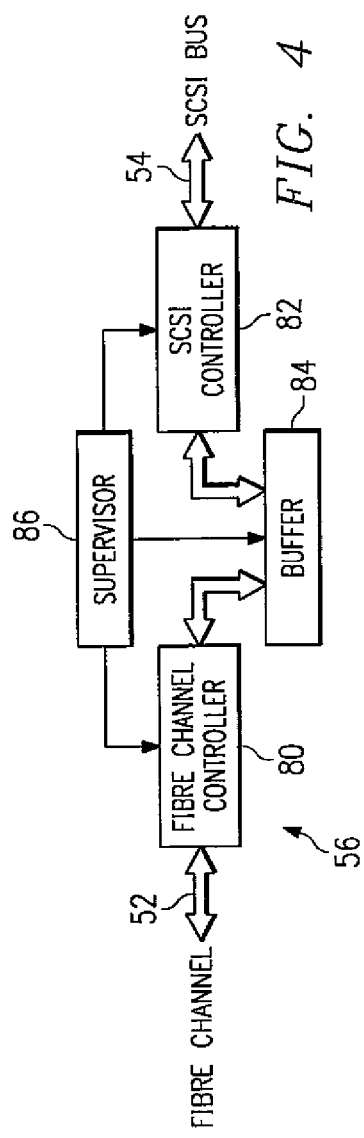
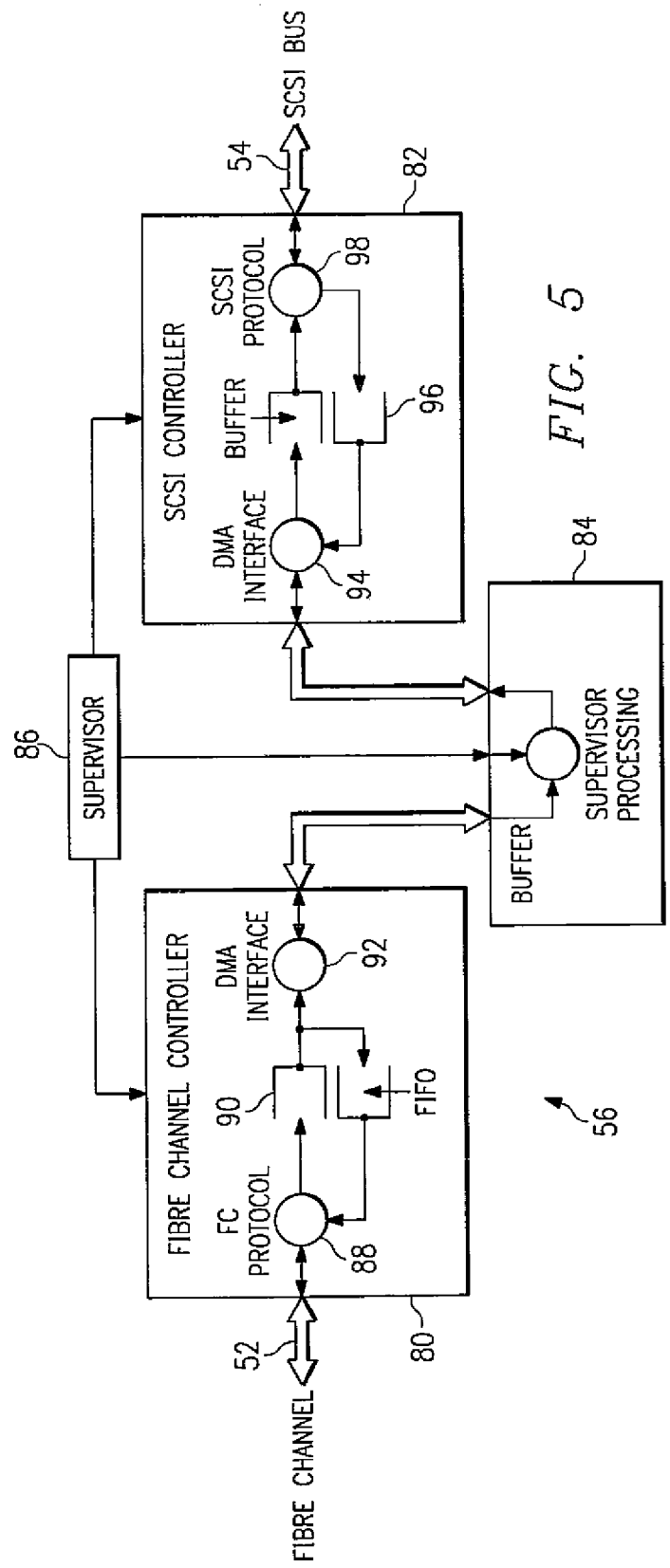

STORAGE ROUTER AND METHOD FOR PROVIDING VIRTUAL LOCAL STORAGE

This application is a continuation of, and claims a benefit of priority under 35 U.S.C. 120 of the filing date of U.S. patent application Ser. No. 11/442,878 entitled "Storage Router and Method for Providing Virtual Local Storage" filed May 30, 2006, which is a continuation of Ser. No. 11/353,826, entitled "Storage Router and Method for Providing Virtual Local Storage" filed on Feb. 14, 2006, which is a continuation of and claims the benefit of priority of U.S. patent application Ser. No. 10/658,163 entitled "Storage Router and Method for Providing Virtual Local Storage" filed on Sep. 9, 2003, which is a continuation of and claims the benefit of benefit of priority of U.S. patent application Ser. No. 10/081,110 by inventors Geoffrey B. Hoese and Jeffery T. Russell, entitled "Storage Router and Method for Providing Virtual Local Storage" filed on Feb. 22, 2002 which in turn is a continuation of and claims benefit of priority of U.S. application Ser. No. 09/354,682 by inventors Geoffrey B. Hoese and Jeffrey T. Russell, entitled "Storage Router and Method for Providing Virtual Local Storage" filed on Jul. 15, 1999, now U.S. Pat. No. 6,421,753, which in turn is a continuation of and claims benefit of priority of U.S. patent application Ser. No. 09/001,799, filed on Dec. 31, 1997, now U.S. Pat. No. 5,941,972, and hereby incorporates these applications and patents by reference in their entireties as if they had been fully set forth herein.

TECHNICAL FIELD OF THE INVENTION

This invention relates in general to network storage devices, and more particularly to a storage router and method for providing virtual local storage on remote SCSI storage devices to Fibre Channel devices.

BACKGROUND OF THE INVENTION

Typical storage transport mediums provide for a relatively small number of devices to be attached over relatively short distances. One such transport medium is a Small Computer System Interface (SCSI) protocol, the structure and operation of which is generally well known as is described, for example, in the SCSI-1, SCSI-2 and SCSI-3 specifications. High speed serial interconnects provide enhanced capability to attach a large number of high speed devices to a common storage transport medium over large distances. One such serial interconnect is Fibre Channel, the structure and operation of which is described, for example, in Fibre Channel Physical and Signaling Interface (FC-PH), ANSI X3.230 Fibre Channel Arbitrated Loop (FC-AL), and ANSI X3.272 Fibre Channel Private Loop Direct Attach (FC-PLDA).

Conventional computing devices, such as computer workstations, generally access storage locally or through network interconnects. Local storage typically consists of a disk drive, tape drive, CD-ROM drive or other storage device contained within, or locally connected to the workstation. The workstation provides a file system structure that includes security controls, with access to the local storage device through native low level block protocols. These protocols map directly to the mechanisms used by the storage device and consist of data requests without security controls. Network interconnects typically provide access for a large number of computing devices to data storage on a remote network server. The remote network server provides file system structure, access control, and other miscellaneous capabilities that include the network interface. Access to data through the network server is through network protocols that the server must translate into low level requests to the storage device. A workstation with access to the server storage must translate its file system protocols into network protocols that are used to communicate with the server. Consequently, from the perspective of a workstation, or other computing device, seeking to access such server data, the access is much slower than access to data on a local storage device.

SUMMARY OF THE INVENTION

In accordance with the present invention, a storage router and method for providing virtual local storage on remote SCSI storage devices to Fibre Channel devices are disclosed that provide advantages over conventional network storage devices and methods.

According to one aspect of the present invention, a storage router and storage network provide virtual local storage on remote SCSI storage devices to Fibre Channel devices. A plurality of Fibre Channel devices, such as workstations, are connected to a Fibre Channel transport medium, and a plurality of SCSI storage devices are connected to a SCSI bus transport medium. The storage router interfaces between the Fibre Channel transport medium and the SCSI bus transport medium. The storage router maps between the workstations and the SCSI storage devices and implements access controls for storage space on the SCSI storage devices. The storage router then allows access from the workstations to the SCSI storage devices using native low level, block protocol in accordance with the mapping and the access controls.

According to another aspect of the present invention, virtual local storage on remote SCSI storage devices is provided to Fibre Channel devices. A Fibre Channel transport medium and a SCSI bus transport medium are interfaced with. A configuration is maintained for SCSI storage devices connected to the SCSI bus transport medium. The configuration maps between Fibre Channel devices and the SCSI storage devices and implements access controls for storage space on the SCSI storage devices. Access is then allowed from Fibre Channel initiator devices to SCSI storage devices using native low level, block protocol in accordance with the configuration.

A technical advantage of the present invention is the ability to centralize local storage for networked workstations without any cost of speed or overhead. Each workstation accesses its virtual local storage as if it were locally connected. Further, the centralized storage devices can be located in a significantly remote position even in excess of ten kilometers as defined by Fibre Channel standards.

Another technical advantage of the present invention is the ability to centrally control and administer storage space for connected users without limiting the speed with which the users can access local data. In addition, global access to data, backups, virus scanning and redundancy can be more easily accomplished by centrally located storage devices.

A further technical advantage of the present invention is providing support for SCSI storage devices as local storage for Fibre Channel hosts. In addition, the present invention helps to provide extended capabilities for Fibre Channel and for management of storage subsystems.

BRIEF DESCRIPTION OF THE DRAWINGS

A more complete understanding of the present invention and the advantages thereof may be acquired by referring to the following description taken in conjunction with the accompanying drawings, in which like reference numbers indicate like features, and wherein:

FIG. 4 is a block diagram of one embodiment of the storage router of FIG. 3; and FIG. 5 is a block diagram of one embodiment of data flow within the storage router of FIG. 4.

DETAILED DESCRIPTION OF THE INVENTION

Figure 1:
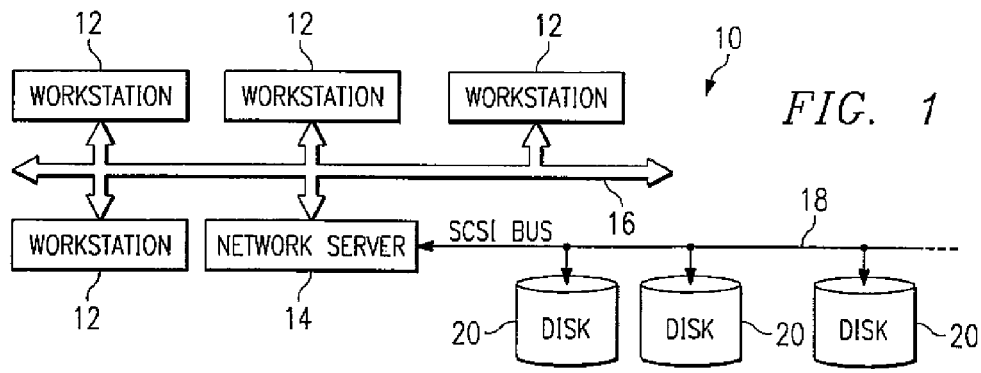
FIG. 1 is a block diagram of a conventional network that provides storage through a network server.

FIG. 1 is a block diagram of a conventional network, indicated generally at 10, that provides access to storage through a network server. As shown, network 10 includes a plurality of workstations 12 interconnected with a network server 14 via a network transport medium 16. Each workstation 12 can generally comprise a processor, memory, input/output devices, storage devices and a network adapter as well as other common computer components. Network server 14 uses a SCSI bus 18 as a storage transport medium to interconnect with a plurality of storage devices 20 (tape drives, disk drives, etc.). In the embodiment of FIG. 1, network transport medium 16 is a network connection and storage devices 20 comprise hard disk drives, although there are numerous alternate transport mediums and storage devices.

In network 10, each workstation 12 has access to its local storage device as well as network access to data on storage devices 20. The access to a local storage device is typically through native low level, block protocols. On the other hand, access by a workstation 12 to storage devices 20 requires the participation of network server 14 which implements a file system and transfers data to workstations 12 only through high level file system protocols. Only network server 14 communicates with storage devices 20 via native low level, block protocols. Consequently, the network access by workstations 12 through network server 14 is slow with respect to their access to local storage. In network 10, it can also be a logistical problem to centrally manage and administer local data distributed across an organization, including accomplishing tasks such as backups, virus scanning and redundancy.

Figure 2:
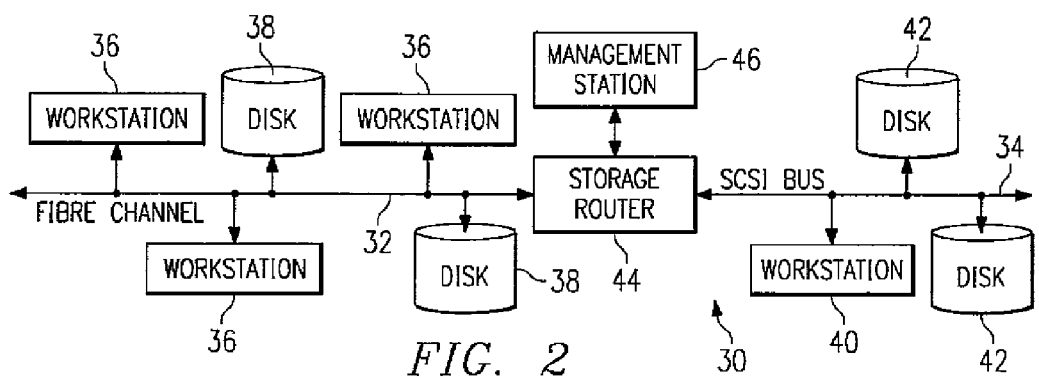
FIG. 2 is a block diagram of one embodiment of a storage network with a storage router that provides global access and routing.

FIG. 2 is a block diagram of one embodiment of a storage network, indicated generally at 30, with a storage router that provides global access and routing. This environment is significantly different from that of FIG. 1 in that there is no network server involved. In FIG. 2, a Fibre Channel high speed serial transport 32 interconnects a plurality of workstations 36 and storage devices 38. A SCSI bus storage transport medium interconnects workstations 40 and storage devices 42. A storage router 44 then serves to interconnect these mediums and provide devices on either medium global, transparent access to devices on the other medium. Storage router 44 routes requests from initiator devices on one medium to target devices on the other medium and routes data between the target and the initiator. Storage router 44 can allow initiators and targets to be on either side. In this manner, storage router 44 enhances the functionality of Fibre Channel 32, by providing access, for example, to legacy SCSI storage devices on SCSI bus 34. In the embodiment of FIG. 2, the operation of storage router 44 can be managed by a management station 46 connected to the storage router via a direct serial connection.

In storage network 30, any workstation 36 or workstation 40 can access any storage device 38 or storage device 42 through native low level, block protocols, and vice versa. This functionality is enabled by storage router 44 which routes requests and data as a generic transport between Fibre Channel 32 and SCSI bus 34. Storage router 44 uses tables to map devices from one medium to the other and distributes requests and data across Fibre Channel 32 and SCSI bus 34 without any security access controls. Although this extension of the high speed serial interconnect provided by Fibre Channel is beneficial, it is desirable to provide security controls in addition to extended access to storage devices through a native low level, block protocol.

Figure 3:
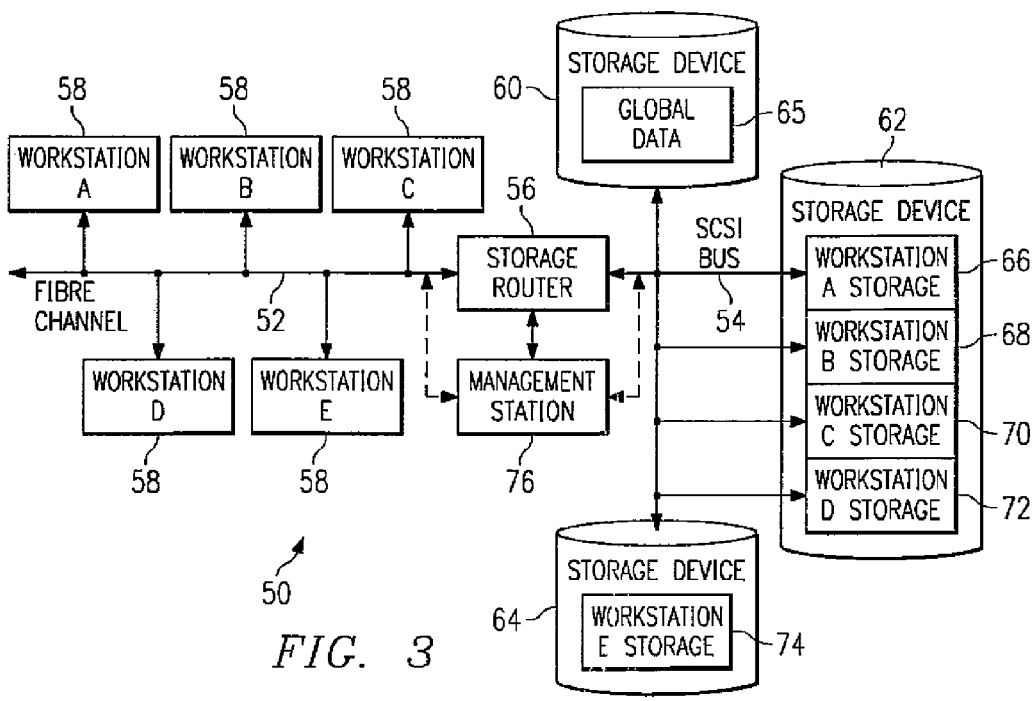
FIG. 3 is a block diagram of one embodiment of a storage network with a storage router that provides virtual local storage.

FIG. 3 is a block diagram of one embodiment of a storage network, indicated generally at 50, with a storage router that provides virtual local storage. Similar to that of FIG. 2, storage network 50 includes a Fibre Channel high speed serial interconnect 52 and a SCSI bus 54 bridged by a storage router 56. Storage router 56 of FIG. 3 provides for a large number of workstations 58 to be interconnected on a common storage transport and to access common storage devices 60, 62 and 64 through native low level, block protocols.

According to the present invention, storage router 56 has enhanced functionality to implement security controls and routing such that each workstation 58 can have access to a specific subset of the overall data stored in storage devices 60, 62 and 64. This specific subset of data has the appearance and characteristics of local storage and is referred to herein as virtual local storage. Storage router 56 allows the configuration and modification of the storage allocated to each attached workstation 58 through the use of mapping tables or other mapping techniques.

As shown in FIG. 3, for example, storage device 60 can be configured to provide global data 65 which can be accessed by all workstations 58. Storage device 62 can be configured to provide partitioned subsets 66, 68, 70 and 72, where each partition is allocated to one of the workstations 58 (workstations A, B, C and D). These subsets 66, 68, 70 and 72 can only be accessed by the associated workstation 58 and appear to the associated workstation 58 as local storage accessed using native low level, block protocols. Similarly, storage device 64 can be allocated as storage for the remaining workstation 58 (workstation E).

Storage router 56 combines access control with routing such that each workstation 58 has controlled access to only the specified partition of storage device 62 which forms virtual local storage for the workstation 58 This access control allows security control for the specified data partitions. Storage router 56 allows this allocation of storage devices 60, 62 and 64 to be managed by a management station 76. Management station 76 can connect directly to storage router 56 via a direct connection or, alternately, can interface with storage router 56 through either Fibre Channel 52 or SCSI bus 54. In the latter case, management station 76 can be a workstation or other computing device with special rights such that storage router 56 allows access to mapping tables and shows storage devices 60, 62 and 64 as they exist physically rather than as they have been allocated.

The environment of FIG. 3 extends the concept of single workstation having locally connected storage devices to a storage network 50 in which workstations 58 are provided virtual local storage in a manner transparent to workstations 58. Storage router 56 provides centralized control of what each workstation 58 sees as its local drive, as well as what data it sees as global data accessible by other workstations 58. Consequently, the storage space considered by the workstation 58 to be its local storage is actually a partition (i.e., logical storage definition) of a physically remote storage device 60, 62 or 64 connected through storage router 56. This means that similar requests from workstations 58 for access to their local storage devices produce different accesses to the storage space on storage devices 60, 62 and 64. Further, no access from a workstation 58 is allowed to the virtual local storage of another workstation 58.

The collective storage provided by storage devices 60, 62 and 64 can have blocks allocated by programming means within storage router 56. To accomplish this function, storage router 56 can include routing tables and security controls that define storage allocation for each workstation 58. The advantages provided by implementing virtual local storage in centralized storage devices include the ability to do collective backups and other collective administrative functions more easily. This is accomplished without limiting the performance of workstations 58 because storage access involves native low level, block protocols and does not involve the overhead of high level protocols and file systems required by network servers.

FIG. 4 is a block diagram of one embodiment of storage router 56 of FIG. 3. Storage router 56 can comprise a Fibre Channel controller 80 that interfaces with Fibre Channel 52 and a SCSI controller 82 that interfaces with SCSI bus 54. A buffer 84 provides memory work space and is connected to both Fibre Channel controller 80 and to SCSI controller 82. A supervisor unit 86 is connected to Fibre Channel controller 80, SCSI controller 82 and buffer 84. Supervisor unit 86 comprises a microprocessor for controlling operation of storage router 56 and to handle mapping and-security access for requests between Fibre Channel 52 and SCSI bus 54.

FIG. 5 is a block diagram of one embodiment of data flow within storage router 56 of FIG. 4. As shown, data from Fibre Channel 52 is processed by a Fibre Channel (FC) protocol unit 88 and placed in a FIFO queue 90. A direct memory access (DMA) interface 92 then takes data out of FIFO queue 90 and places it in buffer 84. Supervisor unit 86 processes the data in buffer 84 as represented by supervisor processing 93. This processing involves mapping between Fibre Channel 52 and SCSI bus 54 and applying access controls and routing functions. A DMA interface 94 then pulls data from buffer 84 and places it into a buffer 96. A SCSI protocol unit 98 pulls data from buffer 96 and communicates the data on SCSI bus 54. Data flow in the reverse direction, from SCSI bus 54 to Fibre Channel 52, is accomplished in a reverse manner.

The storage router of the present invention is a bridge device that connects a Fibre Channel link directly to a SCSI bus and enables the exchange of SCSI command set information between application clients on SCSI bus devices and the Fibre Channel links. Further, the storage router applies access controls such that virtual local storage can be established in remote SCSI storage devices for workstations on the Fibre Channel link. In one embodiment, the storage router provides a connection for Fibre Channel links running the SCSI Fibre Channel Protocol (FCP) to legacy SCSI devices attached to a SCSI bus. The Fibre Channel topology is typically an Arbitrated Loop (FC_AL).

In part, the storage router enables a migration path Fibre Channel based, serial SCSI networks by providing connectivity for legacy SCSI bus devices. The storage router can be attached to a Fibre Channel Arbitrated Loop and a SCSI bus to support a number of SCSI devices. Using configuration settings, the storage router can make the SCSI bus devices available on the Fibre Channel network as FCP logical units. Once the configuration is defined, operation of the storage router is transparent to application clients. In this manner, the storage router can form an integral part of the migration to new Fibre Channel based networks while providing a means to continue using legacy SCSI devices.

In one implementation (not shown), the storage router can be a rack mount or free standing device with an internal power supply. The storage router can have a Fibre Channel and SCSI port, and a standard, detachable power cord can be used, the FC connector can be a copper DB9 connector, and the SCSI connector can be a 68-pin type. Additional modular jacks can be provided for a serial port and an 802.3 10BaseT port, i.e. twisted pair Ethernet, for management access. The SCSI port of the storage router an support SCSI direct and sequential access target devices and can support SCSI initiators, as well. The Fibre Channel port can interface to SCSI-3 FCP enabled devices and initiators.

To accomplish its functionality, one implementation of the storage router uses: a Fibre Channel interface based on the HEWLETT-PACKARD TACHYON HPFC-5000 controller and a GLM media interface; an Intel 80960RP processor, incorporating independent data and program memory spaces, and associated logic required to implement a stand alone processing system; and a serial port for debug and system configuration. Further, this implementation includes a SCSI interface supporting Fast-20 based on the SYMBIOS 53C8xx series SCSI controllers, and an operating system based upon the WIND RIVERS SYSTEMS VXWORKS or IXWORKS kernel, as determined by design. In addition, the storage router includes software as required to control basic functions of the various elements, and to provide appropriate translations between the FC and SCSI protocols.

The storage router has various modes of operation that are possible between FC and SCSI target and initiator combinations. These modes are: FC Initiator to SCSI Target; SCSI Initiator to FC Target; SCSI Initiator to SCSI Target; and FC Initiator to FC Target. The first two modes can be supported concurrently in a single storage router device and are discussed briefly below. The third mode can involve two storage router devices back to back and can serve primarily as a device to extend the physical distance beyond that possible via a direct SCSI connection. The last mode can be used to carry FC protocols encapsulated on other transmission technologies (e.g. ATM, SONET), or to act as a bridge between two FC loops (e.g. as a two port fabric).

The FC Initiator to SCSI Target mode provides for the basic configuration of a server using Fibre Channel to communicate with SCSI targets. This mode requires that a host system have an FC attached device and associated device drivers and software to generate SCSI-3 FCP requests. This system acts as an initiator using the storage router to communicate with SCSI target devices. The SCSI devices supported can include SCSI-2 compliant direct or sequential access (disk or tape) devices. The storage router serves to translate command and status information and transfer data between SCSI-3 FCP and SCSI-2, allowing the use of standard SCSI-2 devices in a Fibre Channel environment.

The SCSI Initiator to FC Target mode provides for the configuration of a server using SCSI-2 to communicate with Fibre Channel targets. This mode requires that a host system has a SCSI-2 interface and driver software to control SCSI-2 target devices. The storage router will connect to the SCSI-2 bus and respond as a target to multiple target IDs. Configuration information is required to identify the target IDs to which the bridge will respond on the SCSI-2 bus. The storage router then translates the SCSI-2 requests to SCSI-3 FCP requests, allowing the use of FC devices with a SCSI host system. This will also allow features such as a tape device acting as an initiator on the SCSI bus to provide full support for this type of SCSI device.

In general, user configuration of the storage router will be needed to support various functional modes of operation.

Configuration can be modified, for example, through a serial port or through an Ethernet port via SNMP (simple network management protocol) or the Telnet session. Specifically, SNMP manageability can be provided via a B02.3 Ethernet interface. This can provide for configuration changes as well as providing statistics and error information. Configuration can also be performed via TELNET or RS-232 interfaces with menu driven command interfaces. Configuration information can be stored in a segment of flash memory and can be retained across resets and power off cycles. Password protection can also be provided.

In the first two modes of operation, addressing information is needed to map from FC addressing to SCSI addressing and vice versa. This can be 'hard' configuration data, due to the need for address information to be maintained across initialization and partial reconfigurations of the Fibre Channel address space. In an arbitrated loop configuration, user configured addresses will be needed for AL_PAs in order to insure that known addresses are provided between loop reconfigurations.

With respect to addressing, FCP and SCSI 2 systems employ different methods of addressing target devices. Additionally, the inclusion of a storage router means that a method of translating device IDs needs to be implemented. In addition, the storage router can respond to commands without passing the commands through to the opposite interface. This can be implemented to allow all generic FCP and SCSI commands to pass through the storage router to address attached devices, but allow for configuration and diagnostics to be performed directly on the storage router through the FC and SCSI interfaces.

Management commands are those intended to be processed by the storage router controller directly. This may include diagnostic, mode, and log commands as well as other vendor-specific commands. These commands can be received and processed by both the FOP and SCSI interfaces, but are not typically bridged to the opposite interface. These commands may also have side effects on the operation of the storage router, and cause other storage router operations to change or terminate.

A primary method of addressing management commands though the FCP and SCSI interfaces can be through peripheral device type addressing. For example, the storage router can respond to all operations addressed to logical unit (LUN) zero as a controller device. Commands that the storage router will support can include INQUIRY as well as vendor-specific management commands. These are to be generally consistent with SCC standard commands.

The SCSI bus is capable of establishing bus connections between targets. These targets may internally address logical units. Thus, the prioritized addressing scheme used by SCSI subsystems can be represented as follows: BUS:TARGET: LOGICAL UNIT. The BUS identification is intrinsic in the configuration, as a SCSI initiator is attached to only one bus. Target addressing is handled by bus arbitration from information provided to the arbitrating device. Target addresses are assigned to SCSI devices directly through some means of configuration, such as a hardware jumper, switch setting, or device specific software configuration. As such, the SCSI protocol provides only logical unit addressing within the Identify message. Bus and target information is implied by the established connection.

Fibre Channel devices within a fabric are addressed by a unique port identifier. This identifier is assigned to a port during certain well-defined states of the FC protocol. Individual ports are allowed to arbitrate for a known, user defined address. If such an address is not provided, or if arbitration for a particular-user address fails, the port is assigned a unique address by the FC protocol. This address is generally not guaranteed to be unique between instances. Various scenarios exist where the AL-PA of a device will change, either after power cycle or loop reconfiguration.

The FC protocol also provides a logical unit address field within command structures to provide addressing to devices internal to a port. The FCP_CMD payload specifies an eight byte LUN field. Subsequent identification of the exchange between devices is provided by the FQXID (Fully Qualified Exchange ID).

FC ports can be required to have specific addresses assigned. Although basic functionality is not dependent on this, changes in the loop configuration could result in disk targets changing identifiers with the potential risk of data corruption or loss. This configuration can be straightforward, and can consist of providing the device a loop-unique ID (AL_PA) in the range of "01h" to "EFh." Storage routers could be shipped with a default value with the assumption that most configurations will be using single storage routers and no other devices requesting the present ID. This would provide a minimum amount of initial configuration to the system administrator. Alternately, storage routers could be defaulted to assume any address so that configurations requiring multiple storage routers on a loop would not require that the administrator assign a unique ID to the additional storage routers.

Address translation is needed where commands are issued in the cases FC Initiator to SCSI Target and SCSI Initiator to FC Target. Target responses are qualified by the FQXID and will retain the translation acquired at the beginning of the exchange. This prevents configuration changes occurring during the course of execution of a command from causing data or state information to be inadvertently misdirected. Configuration can be required in cases of SCSI Initiator to FC Target, as discovery may not effectively allow for FCP targets to consistently be found. This is due to an FC arbitrated loop supporting addressing of a larger number of devices than a SCSI bus and the possibility of FC devices changing their AL-PA due to device insertion or other loop initialization.

In the direct method, the translation to BUS:TARGET: LUN of the SCSI address information will be direct. That is, the values represented in the FCP LUN field will directly map to the values in effect on the SCSI bus. This provides a clean translation and does not require SCSI bus discovery. It also allows devices to be dynamically added to the SCSI bus without modifying the address map. It may not allow for complete discovery by FCP initiator devices, as gaps between device addresses may halt the discovery process. Legacy SCSI device drivers typically halt discovery on a target device at the first unoccupied LUN, and proceed to the next target. This would lead to some devices not being discovered. However, this allows for hot plugged devices and other changes to the loop addressing.

In the ordered method, ordered translation requires that the storage router perform discovery on reset, and collapses the addresses on the SCSI bus to sequential FSP LUN values. Thus, the FCP LUN values 0-N can represent N+1 SCSI devices, regardless of SCSI address values, in the order in which they are isolated during the SCSI discovery process. This would allow the FCP initiator discovery process to identify all mapped SCSI devices without further configuration. This has the limitation that hot-plugged devices will not be identified until the next reset cycle. In this case, the address may also be altered as well.

In addition to addressing, according to the present invention, the storage router provides configuration and access controls that cause certain requests from FC Initiators to be directed to assigned virtual local storage partitioned on SCSI storage devices. For example, the same request for LUN 0 (local storage) by two different FC Initiators can be directed to two separate subsets of storage. The storage router can use tables to map, for each initiator, what storage access is available and what partition is being addressed by a particular request. In this manner, the storage space provided by SCSI storage devices can be allocated to FC initiators to provide virtual local storage as well as to create any other desired configuration for secured access.

Although the present invention has been described in detail, it should be understood that various changes, substitutions, and alterations can be made hereto without departing from the spirit and scope of the invention as defined by the appended claims.

What is claimed is:

1. A storage router for providing virtual local storage on storage devices to a host device, comprising:
    a first controller operable to connect to and interface with a first transport medium;
    a second controller operable to connect to and interface with a second transport medium, wherein at least one of the first transport medium and the second transport medium is a serial transport medium; and
    a supervisor unit coupled to the first and second controllers, the supervisor unit operable to:
        maintain a map that comprises host identifications for host devices connected via the first transport medium and representations of at least a portion of a storage device connected via the second transport medium, the map associating subsets of storage space on the storage devices with the host devices; and
        for a request received from a host, access the map to determine the storage space associated with the requesting host using the requesting host's host identification and allowing the request from the requesting host to pass through to the requested subset of storage space if the requesting host is mapped to such requested subset of storage space, wherein the request is a native low level block protocol when received from the requesting host and is forwarded to the storage device containing the storage space as a native low level block protocol request.

2. The storage router of claim 1, wherein the first transport medium is a serial transport medium and the native low level block protocol request received at the storage router is encapsulated in a transport protocol compatible with the first transport medium.

3. The storage router of claim 2, wherein the first transport medium is a fibre channel transport medium and the native low level block protocol request received at the storage router is encapsulated in a fibre channel transport protocol.

4. The storage router of claim 2, wherein the first transport medium is an iSCSI-compatible transport medium and the native low level block protocol request received at the storage router is encapsulated in an iSCSI transport protocol.

5. The storage router of claim 1, wherein the requested subset of storage space comprises a single storage device, storage space across multiple storage devices, a portion of a single storage device or portions of storage across multiple storage devices.

6. The storage router of claim 1, wherein at least one subset of storage space is associated with multiple host devices connected to the first transport medium.

7. The storage router of claim 6, wherein the map further defines global storage available to any host device on the first transport medium.

8. The storage router of claim 7, wherein a host device on the first transport medium that is not contained in the map is allowed access to only the global storage.

9. The storage router of claim 1, wherein each subset of storage space is only accessible only by those host devices associated with that particular subset of storage space in the map.

10. The storage router of claim 1, wherein the supervisor unit is further operable to direct requests to a single storage device representation from different host devices on the first transport medium to different physical subsets of storage based on the map.

11. The storage router of claim 1, wherein at least one subset of storage is accessible by at least two host devices, wherein the host devices connected to the first transport medium comprise workstations, and wherein the storage devices comprise hard disk drives.

12. The storage router of claim 1, wherein the serial transport medium is an Ethernet transport medium and an Ethernet-compatible transport protocol is used to transport native low level block protocol requests from the host device over the Ethernet transport medium.

13. The storage router of claim 1, wherein the request is an ATA or SATA native low level block protocol request transported over the second transport medium.

14. The storage router of claim 1, wherein the supervisor unit further comprises a processor.

15. The storage router of claim 14, wherein the processor comprises one of an ASIC, microprocessor, CPU, microcontroller or DSP.

16. The storage router of claim 1, wherein, for the requesting host device, the map maps from the first host identification to a virtual address corresponding to the requested subset of storage.

17. The storage router of claim 1, wherein, for the requesting host device, the map maps from the first host identification to a virtual address for the requested subset of storage, and further to a physical address for the requested subset of storage.

18. A method for providing virtual local storage on storage devices to host devices, comprising:
    interfacing with a first transport medium;
    interfacing with a second transport medium, wherein at least one of the first transport medium and the second transport medium is a serial transport medium; and
    maintaining a map that comprises host identifications for host devices on the first transport medium and representations of at least a portion of a storage device on the second transport medium, the map associating a subset of storage space on the storage devices with the host devices;
    receiving a native low level block protocol request from a host; and
    accessing the map to determine if the requesting host device is mapped to the requested subset of storage space and forwarding the native low level block protocol request to the requested subset of storage space if the requesting host device is mapped to such requested subset of storage space.

19. The method of claim 18, wherein the first transport medium is a serial transport medium and wherein receiving a native low level block protocol request comprises receiving a native low level block protocol request encapsulated in a transport protocol that is compatible with the first transport medium.

20. The method of claim 19, wherein the first transport medium is a fibre channel transport medium and wherein receiving a native low level block protocol request comprises receiving a SCSI protocol request encapsulated in a fibre channel transport protocol.

21. The method of claim 19, wherein the first transport medium is an iSCSI compatible transport medium and wherein receiving a native low level block protocol request comprises receiving a SCSI protocol request encapsulated in an iSCSI transport protocol.

22. The method of claim 18, wherein the requested subset of storage space comprises a single storage device, storage space across multiple storage devices, a portion of a single storage device or portions of storage across multiple storage devices.

23. The method of claim 22, further comprising associating the at least one subset of storage space with multiple host devices.

24. The method of claim 23, wherein further comprising defining within the map global storage available to any host device on the first transport medium.

25. The method of claim 23, wherein further comprising allowing any host device on the first transport medium that does not have a representation within the map access to only the global storage.

26. The method of claim 18, wherein each subset of storage space is only accessible only by those host devices associated with that particular subset of storage space in the map.

27. The method of claim 1, further comprising directing requests to a single storage device representation from different host devices on the first transport medium to different physical subsets of storage in accordance with the map.

28. The method of claim 18, wherein the serial transport medium is an Ethernet transport medium, and further comprising using an Ethernet-compatible transport protocol to transport native low level block protocol requests from the host device over the Ethernet transport medium.

29. The method of claim 18, further comprising encapsulating a SCSI native low level block protocol request in a Fibre Channel transport protocol for transport over the second transport medium.

30. The method of claim 18, further comprising forwarding to the subset of storage an ATA or SATA native low level block protocol request over the second transport medium.

31. The method of claim 18, further comprising mapping the first host identification to a virtual address corresponding to the requested subset of storage.

32. The method of claim 1, further comprising mapping the first host identification to a virtual address for the requested subset of storage, and further to a physical address for the requested subset of storage.

33. A storage router for providing virtual local storage on storage devices to host devices, comprising:
a first controller operable to interface with a first transport medium;
a second controller operable to interface with a second transport medium, wherein at least one of the first transport medium and the second transport medium is a serial transport medium; and
a supervisor unit coupled to the first and second controllers and the buffer, the supervisor unit operable to:
present the storage devices to the host devices in a manner so that the storage devices appear to the host devices as locally attached to the host device so as to have the appearance of locally attached storage;
maintain a map that maps between the host devices and the storage devices, the map comprising a representation of the host devices and a representation of the storage devices;
access the map to determine whether a host device making a request is mapped to a requested storage device to control access; and
control host device access by allowing the requesting host device to access the requested storage device if the requesting host device is mapped to the requested storage device, otherwise denying access, wherein the request is low level block protocol request at the requesting host device, during transport over the first and second transport mediums and when received at the requested storage device.

34. A storage router for providing virtual local storage on storage devices to host devices, comprising:
a first controller operable to interface with a first serial transport medium, wherein the first serial transport medium is capable of transporting packets according to a transport protocol;
a second controller operable to interface with a second transport medium; and
a supervisor unit coupled to the first and second controllers and the buffer, the supervisor unit operable to:
provide virtual local storage on storage devices to host devices;
maintain a map that maps between the host devices and the storage devices, the map comprising representations of the host devices and representations of the storage devices;
access the map to determine whether a host device making a request is mapped to a requested storage device to control access, wherein the request from the host is a low level block protocol request packaged in a transport protocol; and
if the host device is determined to have access rights, forwarding the request as a low level block protocol to the requested storage device, else denying access to the requesting host device.

35. The storage router of claim 34, wherein the low level block protocol request received at the storage router is SCSI and the transport protocol is Fibre Channel.

36. The storage router of claim 35, wherein the low level block protocol request is SCSI and the transport protocol allows transport of the SCSI protocol request over an IP network.

37. The storage router of claim 34, wherein the requested storage device comprises a single storage device, storage space across multiple storage devices, a portion of a single storage device or portions of storage across multiple storage devices.

38. The storage router of claim 37, wherein each requested storage device is only accessible only by those host devices associated with that particular subset of storage space in the map.

39. The storage router of claim 34, wherein the supervisor unit is further operable to direct requests to a same storage device representation from different host devices on the first transport medium to different physical subsets of storage based on the map.

40. The storage router of claim 34, wherein the low level block protocol request received at the storage router is SCSI and the transport protocol is iSCSI.

41. The storage router of claim 34, wherein the low level block protocol request transported over the second transport medium is a SCSI low level block protocol request.

42. The storage router of claim 34, wherein the low level block protocol request transported over the second transport medium is an ATA low level block protocol request.

43. The storage router of claim 34, wherein the supervisor unit further comprises a processor comprising an ASIC, microprocessor, CPU, microcontroller or DSP.

44. The storage router of claim 34, wherein, for the requesting host device, the map maps from the first host identification to a virtual address corresponding to the requested subset of storage.

45. The storage router of claim 34, wherein, for the requesting host device, the map maps from the first host identification to a virtual address for the requested subset of storage, and further to a physical address for the requested subset of storage.

46. A method for controlling access between host devices and virtual local storage on storage devices, comprising:
   interfacing with a serial transport medium operable according to a transport protocol;
   interfacing with a second transport medium;
   providing virtual local storage on storage devices to host devices;
   maintaining a map that maps between the host devices and the storage devices, the map comprising representations of the host devices and representations of the storage devices;
   receiving a low level block protocol request to access a storage device from a requesting host over the serial transport medium, wherein the low level block protocol request is packaged in a transport protocol;
   accessing the map to determine whether the requesting host device has access rights to the requested storage device; and
   if the requesting host device has access rights to the requested storage device, forwarding the request as a low level block protocol request to the requested storage device.

47. The method of claim 46, wherein the low level block protocol request received from the requesting host is a SCSI protocol request packaged in a Fibre Channel transport protocol.

48. The method of claim 46, wherein the low level block protocol request is received from the requesting host is a SCSI protocol request packaged in a transport protocol allows transport of the SCSI protocol request over an IP network.

49. The method of claim 46, wherein the requested storage device comprises a single storage device, storage space across multiple storage devices, a portion of a single storage device or portions of storage across multiple storage devices.

50. The method of claim 46, wherein each requested storage device is only accessible only by those host devices associated with that particular subset of storage space in the map.

51. The method of claim 41, wherein the received encapsulated low level block protocol request is un-encapsulated from the transport protocol and the un-encapsulated low level block protocol request is reviewed to determine the requested storage device.

52. The method of claim 51, further comprising comparing the representation of the requesting host device/representation of the requested storage device information to a table of allowed storage device/host devices combinations.

53. The method of claim 51, wherein the low level block protocol request transported over the second transport medium is a SCSI, SATA or ATA low level block protocol request.

54. The method claim 46, further comprising mapping from the first host identification to a virtual address for the requested subset of storage, and further to a physical address for the requested subset of storage.

* * * * *